United States Patent [19]

Milgram

[11] Patent Number: 4,676,899
[45] Date of Patent: Jun. 30, 1987

[54] TANKSHIP ON-BOARD OIL LEAK TREATING SYSTEM

[75] Inventor: Jerome H. Milgram, Arlington, Mass.

[73] Assignee: Massachusetts Institute of Technology, Cambridge, Mass.

[21] Appl. No.: 809,151

[22] Filed: Dec. 16, 1985

[51] Int. Cl.⁴ .......................... E02B 15/04; C02F 1/40
[52] U.S. Cl. .................................... 210/218; 210/220; 210/242.1; 210/925
[58] Field of Search .................. 210/925, 242.1, 242.3, 210/242.4, 218, 220, 923, 242.2

[56] References Cited

U.S. PATENT DOCUMENTS

| 3,457,168 | 7/1969 | Malmberg et al. | 210/925 |
| 3,532,622 | 10/1970 | McNeely | 210/925 |
| 3,561,601 | 2/1971 | McNeely | 210/925 |
| 4,033,869 | 7/1977 | McGrew | 210/767 |
| 4,046,691 | 9/1977 | Irons | 210/925 |
| 4,301,006 | 11/1981 | Davis | 210/925 |
| 4,420,400 | 12/1983 | Weitzen | 210/925 |
| 4,425,240 | 1/1984 | Johnson | 210/801 |
| 4,551,244 | 11/1985 | Inoue | 210/925 |

FOREIGN PATENT DOCUMENTS 1093755  5/1984  U.S.S.R. .............................. 210/925

Primary Examiner—Benoit Castel

[57] ABSTRACT

An oil treating system for use with a tank of oil onboard a tankship includes a container of oil treating agent, means for creating a plume of gas bubbles rising in the oil in the tank, a vent for allowing escape of gas from the tank, and means for introducing the oil treating agent into the plume of gas bubbles rising in the oil, whereby the rising bubbles induce upward flow in their vicinities in the oil with counterbalancing downward flows elsewhere in the oil, with turbulence generated by flow of oil around the bubbles and in their wakes, for rapid and efficient mixing of treating agent into the oil.

6 Claims, 4 Drawing Figures

U.S. Patent   Jun. 30, 1987   4,676,899
FIG 1
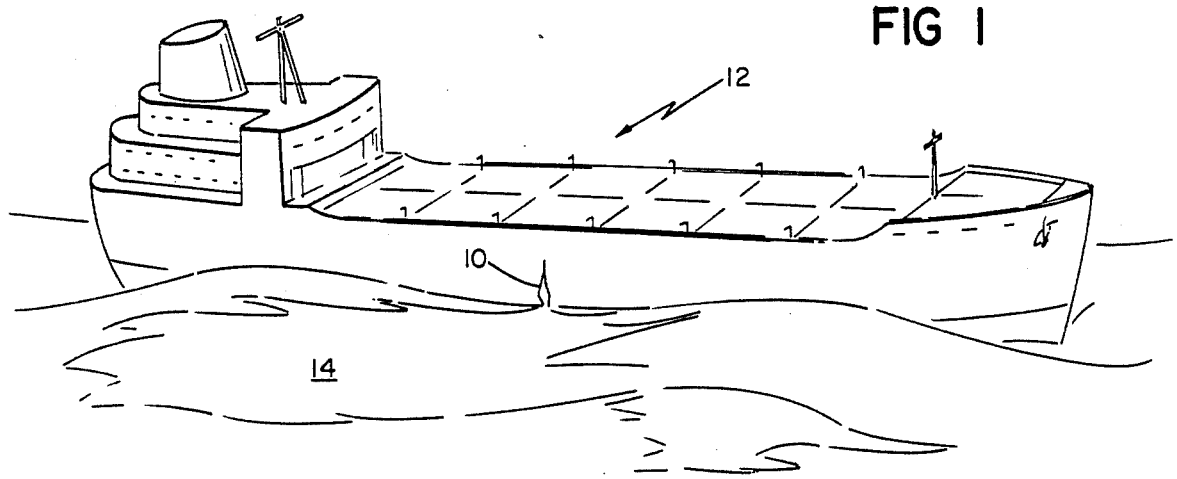
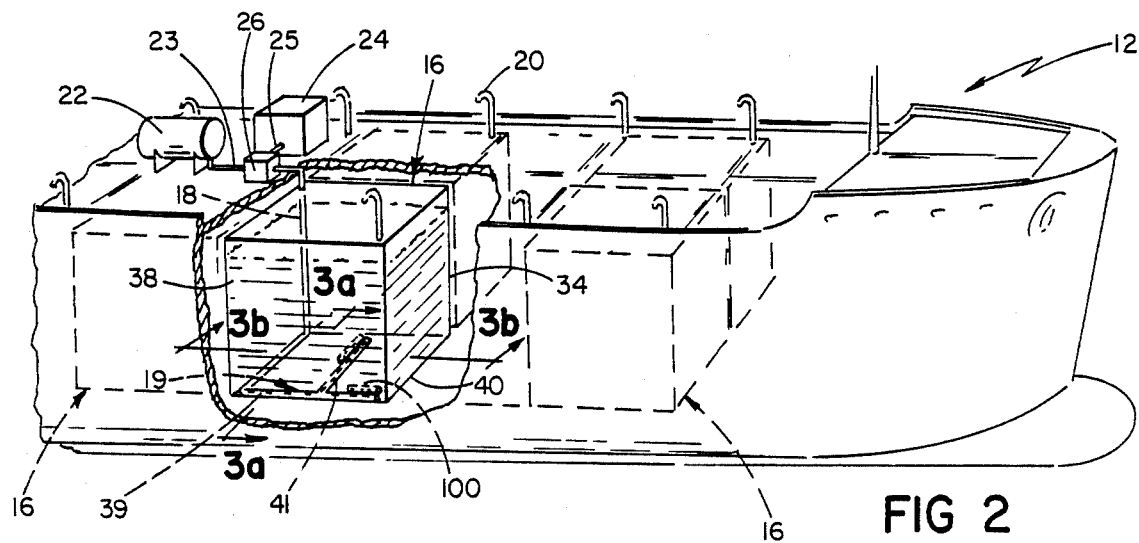
FIG 2
FIG 3a
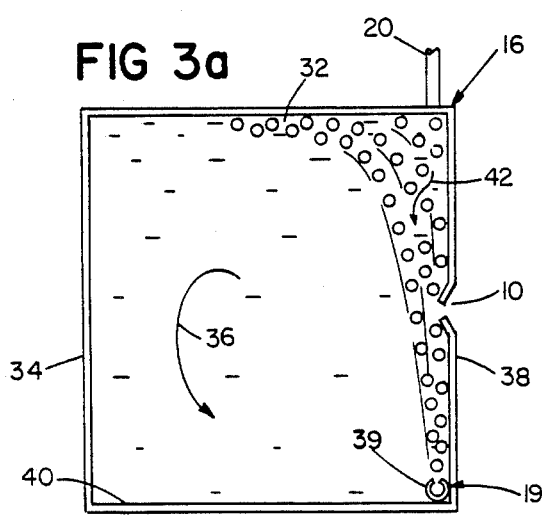
FIG 3b
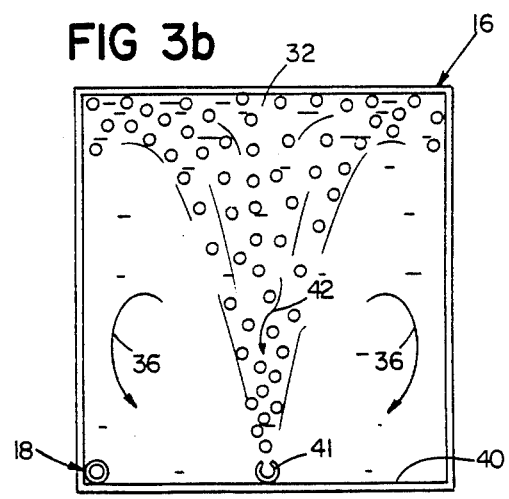

TANKSHIP ON-BOARD OIL LEAK TREATING SYSTEM

This invention relates to a system for delivering dispersant or other treating agent into oil before it leaks from a damaged oil tanker.

Leaking untreated oil is non-miscible with water and forms a slick on the water surface with attendant damage to the environment. To prevent formation of oil slicks, it is desirable to chemically treat the oil in a manner to render it relatively more water-miscible and therefore less harmful to the environment, and it is desirable that the treatment be initiated as early as possible. It is known to treat leaking oil with sinking agent so the oil sinks after leaking, or to treat the oil in the damaged tank with a gelling agent to restrict leakage from the tank. In every instance, it is very important that the treating agent be mixed with the oil as rapidly as possible after the tank is damaged, before much oil can leak out.

In a system proposed by Davis, U.S. Pat. No. 4,301,006, dispersant was delivered into oil in a leaking tank by rupturing a vessel of dispersant within the oil tank.

SUMMARY OF THE INVENTION

According to the invention, an oil treating system for use with a tank of oil on-board a tankship comprises a container of oil treating agent, means for creating a plume of gas bubbles rising in the oil in the tank, vent means for allowing escape of gas from the tank, and means for introducing the oil treating agent into the plume of gas bubbles rising in the oil, whereby rising gas bubbles induce upward flow in the oil in their vicinities with counterbalancing downward flows elsewhere in the oil, with turbulence generated by flow of oil around the bubbles and in their wakes, for rapid and efficient mixing of treating agent into the oil.

In preferred embodiments, the means for creating a plume of gas bubbles comprises a source of pressurized gas, a first conduit for delivery of gas from the source to the bottom of the tank, and a second conduit disposed adjacent to the bottom of the tank, below the surface of the oil, for delivery of gas from the first conduit to a multiplicity of spaced perforations defined in the wall of the second conduit, the gas passing from the second perforated conduit into the oil via the perforations; the first and second conduit are adapted for delivery of oil treating agent combined with the gas; the second perforated conduit comprises a first segment disposed adjacent the bottom of the tank and extending generally parallel to a wall of the tank, adjacent an exterior surface of the tankship, preferably the second perforated conduit disposed adjacent the bottom of the tank has the form of a T and further comprises a second segment extending through the transverse center of the tank, adjacent the tank bottom; the means for introducing the oil treating agent into the plume of gas bubbles risng in the oil comprises a third perforated conduit disposed adjacent the bottom of the tank, below the surface of the oil; and the second perforated conduit for delivery of gas into the oil in the tank to create the gas plume is disposed immediately below the third perforated conduit for delivery of the treating agent into the plume of gas bubbles rising in the oil in the tank.

These and other features and advantages of the invention will be understood from the following description of a presently preferred embodiment, and from the claims.

DESCRIPTION OF THE PREFERRED EMBODIMENTS

We first briefly describe the drawings.
Drawings
FIG. 1 is a perspective view of an oil tanker with oil leaking from an on-board tank;
FIG. 2 is a similar view, partially in section, of the forward section of the oil tankship equipped with the treatment system of the invention; and
FIGS. 3a and 3b are cross-sectional views taken at 3a-3a and 3b-3b of FIG. 2, respectively.

Referring to FIG. 1, oil escaping through a rupture 10 in the wall of a tankship 12 immediately forms an oil slick 14 on the surface of the water. If seas are rough, the oil can spread to rapidly cover an even greater surface area and cause extensive damage to the environment before clean-up crews are able to contain it. In some areas, such as the arctic, cleanup crews may not be able to respond at all. Speed is crucial in oil spill containment, as the volatile component of the oil readily evaporates leaving behind a gummy residue which can cause irreparable damage to biological species and other contacting surfaces. One presently preferred method of oil spill containment involves use of a chemical dispersant, e.g., Gold Crew Dispersant manufactured by Ara Chem, Inc., of El Cajon, Calif., which, when allowed to mix thoroughly with the oil in a leaking tank, a serious problem in the case of a sudden leak, alters surface tension properties of the escaping oil to prevent formation of the slick.

Referring to FIG. 2, oil is stored on board tankship 12 in a series of tanks 16, each equipped with a first and second conduits 18, 19 for dispensing a gas/dispersant mixture from respective gas and dispersant storage containers 22, 24, via mixing valve 26. Second conduit 19, at the end of conduit 18, is perforated and has the form of a "T". A first segment 39 lies adjacent the bottom of tank 16, extending strategically within the storage tank along the junction of the tank floor 40 with the outer wall 38, and a second segment 41 extends through the transverse center of the tank. A vent 20 allows escape of gas from the tank.

Referring to FIG. 3, when a leak in an oil storage tank 16 on board tankship 12, e.g., through a rupture 10 in tank outer wall 38, is detected by, e.g., human operator or automatic detector means, mixer valve 26 is opened. Gas and treating agent from containers 22, 24 enter conduit 18 via feed lines 23, 25 and valve 26. Container 22 is pressurized to provide a supply of a non-explosive, dry gas, preferably either nitrogen or carbon dioxide ($CO_2$), perhaps from the tankship fire extinguishing system, and container 24 is provided with an accessory pump to allow delivery of treating agent, e.g., Gold Crew Dispersant as mentioned above, to mixing valve 26 at a constant rate.

A pressure regulator at the mixing valve 26 causes the dispersant mixture to issue from perforated second conduit 19, creating directed turbulence in the stored oil in the form of a bubble plume 32, rising from apertures in conduit segments 40 (FIG. 3a) and 41 (FIG. 3b), whereby oil and dispersant become locally mixed with the oil due to turbulence 42 generated by flow of oil around the bubbles and their wakes. In FIG. 3a, the bubble plume 32 rising adjacent to tank wall 38 induces a counterbalancing downward flow 36 adjacent to opposite tank wall 34. Situation of bubble plume 32 against outer tank wall 38 ensures that substantially all oil leaving the tank 16 is mixed with treating agent. Flow 36 continually introduces untreated oil to the mixing plume 32 and ensures that leaking oil must first pass through bubble plume 32 and thus be mixed before leaking from the tankship. In FIG. 3b, gas bubbles 32 rising from the second segment 41 of conduit 19 from a second bubble plume in the center of the tank for further mixing of the oil.

Escaping treated oil, unable to form a slick, becomes randomly distributed by wave action below the surface of the water.

Other embodiments of the invention are within the following claims. For example, gas and oil treating agent may be delivered into the tank via separate conduits, with the gas delivery conduit disposed immediately below the treating agent conduit (a portion 100 is shown in dashed line in FIG. 2 by way of example), and treating agent can be delivered from the overlying treating agent delivery conduit into the rising gas plume.

I claim:

1. An oil treating system for rapid and efficient mixing of an oil treating agent with oil in a tank of oil onboard a tankship, comprising a container of oil treating agent, means for creating a plume of gas bubbles rising in the oil in the tank, said means for creating a plume of gas bubbles comprising a source of pressurized gas, a first conduit for delivery of said gas from said source to the bottom of said tank, and a second conduit disposed adjacent to the bottom of said tank, below the surface of said oil, for delivery of said gas from said first conduit to a multiplicity of spaced perforations defined in the wall of said second conduit, said gas passing from the second perforated conduit into said oil via said perforations, vent means for allowing escape of gas from said tank, and means for introducing said oil treating agent into said plume of gas bubbles rising in said oil, whereby rising gas bubbles induce upward flow in the oil in their vicinities with counterbalancing downward flows elsewhere in the oil, with turbulence generated by flow of oil around the bubbles and in their wakes, for rapid and efficient mixing of said treating agent into said oil.

2. The oil treating system of claim 2 wherein said first and second conduit are adapted for delivery of oil treating agent combined with said gas.

3. The oil treating system of claim 1 wherein said second perforated conduit comprises a first segment disposed adjacent the bottom of said tank and extending generally parallel to a wall of said tank, adjacent an exterior surface of said tankship.

4. The oil treating system of claim 3 wherein said second perforated conduit disposed adjacent the bottom of said tank has the form of a T and further comprises a second segment extending through the transverse center of said tank, adjacent the tank bottom.

5. The oil treating system of claim 1 wherein said means for introducing said oil treating agent into said plume of gas bubbles rising in said oil comprises a third perforated conduit disposed adjacent the bottom of said tank, below the surface of said oil.

6. The oil treating system of claim 1 wherein said second perforated conduit for delivery of gas into the oil in said tank to create said gas plume is disposed immediately below said third perforated conduit for delivery of said treating agent into the plume of gas bubbles rising in the oil in said tank.

* * * * *

UNITED STATES PATENT AND TRADEMARK OFFICE
CERTIFICATE OF CORRECTION

PATENT NO. : 4,676,899

DATED : June 30, 1987

INVENTOR(S) : Jerome H. Milgram

It is certified that error appears in the above-identified patent and that said Letters Patent is hereby corrected as shown below:

Column 1, line 59, "risng" should read -- rising --.

Column 4, claim 2, line 13, "claim 2" should read -- claim 1 --.

Signed and Sealed this

First Day of December, 1987

Attest:

DONALD J. QUIGG

Attesting Officer

Commissioner of Patents and Trademarks